(12) United States Patent
Helfrich

(10) Patent No.: US 7,521,816 B2
(45) Date of Patent: Apr. 21, 2009

(54) WATER CURRENT POWERED MOTOR

(76) Inventor: Jim C. Helfrich, 200 Choteau St., Sun River, MT (US) 59483

( * ) Notice: Subject to any disclaimer, the term of this patent is extended or adjusted under 35 U.S.C. 154(b) by 232 days.

(21) Appl. No.: 11/712,807

(22) Filed: Mar. 1, 2007

(65) Prior Publication Data
US 2008/0211232 A1 Sep. 4, 2008

(51) Int. Cl.
F03B 1/00 (2006.01)
F03D 3/04 (2006.01)

(52) U.S. Cl. .............. 290/54; 290/55; 290/43; 415/3.1

(58) Field of Classification Search ......... 290/43, 290/44, 54, 55; 415/3.1, 4.2
See application file for complete search history.

(56) References Cited

U.S. PATENT DOCUMENTS

| | | | | |
|---|---|---|---|---|
| 4,076,448 A * | 2/1978 | Sanders, Jr. | ........ | 415/198.1 |
| 4,084,918 A * | 4/1978 | Pavlecka | ........ | 415/1 |
| 4,279,569 A * | 7/1981 | Harloff | ........ | 415/53.3 |
| 4,350,900 A * | 9/1982 | Baughman | ........ | 290/55 |
| 4,872,805 A * | 10/1989 | Horiuchi et al. | ........ | 415/7 |
| 5,009,569 A * | 4/1991 | Hector et al. | ........ | 415/4.1 |
| 5,038,049 A * | 8/1991 | Kato | ........ | 290/55 |
| 5,083,899 A * | 1/1992 | Koch | ........ | 415/2.1 |
| 5,391,926 A * | 2/1995 | Staley et al. | ........ | 290/55 |
| 5,852,331 A * | 12/1998 | Giorgini | ........ | 290/55 |
| 5,947,678 A * | 9/1999 | Bergstein | ........ | 415/3.1 |
| 6,465,899 B2 * | 10/2002 | Roberts | ........ | 290/44 |
| 6,538,340 B2 * | 3/2003 | Elder | ........ | 290/55 |
| 6,655,907 B2 * | 12/2003 | Brock et al. | ........ | 415/4.2 |
| 6,740,989 B2 * | 5/2004 | Rowe | ........ | 290/55 |
| 6,841,894 B2 * | 1/2005 | Gomez Gomar | ........ | 290/55 |
| 6,849,964 B2 * | 2/2005 | Becherucci et al. | ........ | 290/55 |
| 6,860,720 B2 * | 3/2005 | Nagy | ........ | 415/208.1 |
| 6,870,280 B2 * | 3/2005 | Pechler | ........ | 290/55 |
| 6,981,839 B2 * | 1/2006 | Fan | ........ | 415/4.1 |
| 7,112,034 B2 * | 9/2006 | Bezemer | ........ | 415/3.1 |
| 7,329,965 B2 * | 2/2008 | Roberts et al. | ........ | 290/55 |

* cited by examiner

Primary Examiner—Nicholas Ponomarenko

(57) ABSTRACT

A water powered motor for extracting raw energy from a water current and converting it to kinetic energy. The water powered motor is generally rectangular in shape with a generally round water wheel consisting of foldable vanes. The vanes receive raw energy produced by water current transforming that raw energy into usable energy for powering a pump, electric generator or as a general power source to power other equipment such as desalinization machinery.

20 Claims, 8 Drawing Sheets

WATER CURRENT POWERED MOTOR

RELATED APPLICATIONS

The present application is related to U.S. Pat. No. 7,075,191 B2, issued Jul. 11, 2006, for WIND AND WATER POWER GENERATION DEVICE USING A RAIL SYSTEM, by Davison, included by reference herein.

The present application is related to U.S. Pat. No. 6,930,406 B2, issued Aug. 16, 2005, for TIDE COMPENSATED SWELL POWERED GENERATOR, by Montgomery, included by reference herein.

The present application is related to U.S. Pat. No. 4,872,805, issued Oct. 10, 1989, for WATER POWERED DEVICE, by Horiuchi, included by reference herein.

The present application is related to U.S. Pat. No. 4,737,070, issued Apr. 12, 1988, for WATER POWERED DEVICE, by Horiuchi, included by reference herein.

The present application is related to U.S. Pat. No. 4,686,376, issued Aug. 11, 1987, for TIDE TURBINE, by Retz, included by reference herein.

The present application is related to U.S. Pat. No. 4,176,283, issued Nov. 27, 1979, for WATER POWERED GENERATOR, by McLaren, included by reference herein.

FIELD OF THE INVENTION

The present invention relates to water powered motors and, more particularly, to a submersible motor that extracts usable power from water currents.

BACKGROUND OF THE INVENTION

Many areas of the world are poorly equipped to provide energy in usable forms to help the local population. Help is needed in water purification from both a contamination and salinity perspective. Electrical power is needed to provide basic medical care for refrigeration, sterilization and lights under which to perform medical procedures in the dark. Large numbers of people, primarily children are infected with a variety of debilitating and life threatening diseases due to water contamination from bacteria and viruses. The remoteness and poverty of most of these peoples prevents large power projects from solving the issues. Continued cost of maintenance prevents the use of simple solutions such as portable generators because there is no money to pay for the fuel to operate them.

In a different situation we have a growning world population that requires increasing amounts of potable water. The oceans are full of water that has a salinity too high to use for human or animal consumption or for agricultural purposes and the fresh water supply in many of these areas is limited and insufficient to meet the current demands let alone an increase on those demands. An inexpensive source of power to desalinate the ocean water has not been available. Often times the problem is complicated by the need to place desalinization equipment miles off shore for best results and the least impact on the environment thus compounding the difficulties of supplying energy to that desalinization equipment.

Other solutions to the problem exist in the form of primitive burning of wood to purify water, the use of solar power to provide purification and some small pumping assistance. Portable generators exist to supply power to these devices. Large scale hydro electric projects occur in many parts of the world as do other energy sources such as coal, gas and nuclear.

All of the other solutions except solar contribute to air pollution and often water pollution from the fall out of the carbon based burning or the disposable of the power plats waste. Other than wood burning by local peoples the cost and maintenance of these power units is significantly higher than most of these peoples in poverty can afford. Large power plants like hydro electric require hundreds of millions if not billions of dollars of investment and often disrupt the local population and environment often setting off other negative economic issues. None of these solutions other than solar (which is limited to use during daylight hours) offers a nearly maintenance free source of power that will operate without an energy cost input.

It is therefore an object of the invention to provide a low cost maintenance reduced energy source.

It is another object of the invention to provide an energy source that can be used in remote locations without the need for a supply line to keep it operating.

It is another object of the invention to reduce environmental impact by elimination chemicals or particulates that could adversely effect water, air or soil quality.

It is another object of the invention to provide an energy source that can be used in deep ocean waters without harming aquatic live.

SUMMARY OF THE INVENTION

In accordance with the present invention, there is provided a water powered motor for extracting raw energy from a water current and converting it to kinetic energy. The water powered motor is generally rectangular in shape with a generally round water wheel consisting of foldable vanes. The vanes receive raw energy produced by water current transforming that raw energy into usable energy for powering a pump, electric generator or as a general power source to power other equipment such as desalinization machinery.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
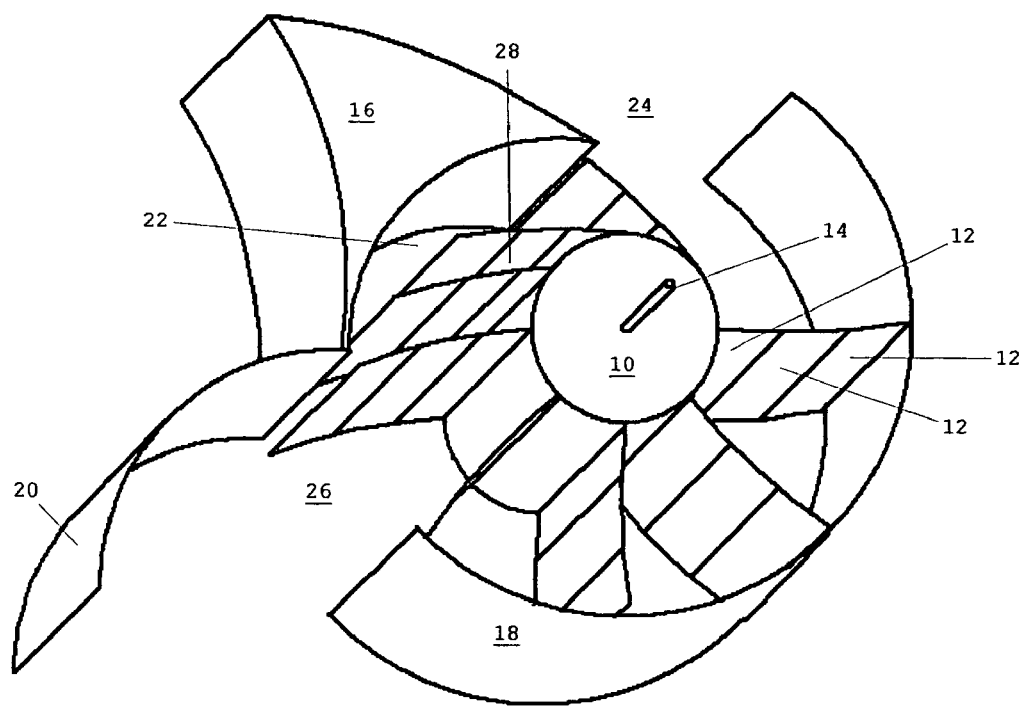
FIG. 1 is a top perspective view of a power wheel with vanes and diversions.

FIG. 1 is a top perspective view of a power wheel with vanes and diversions.

Figure 2:
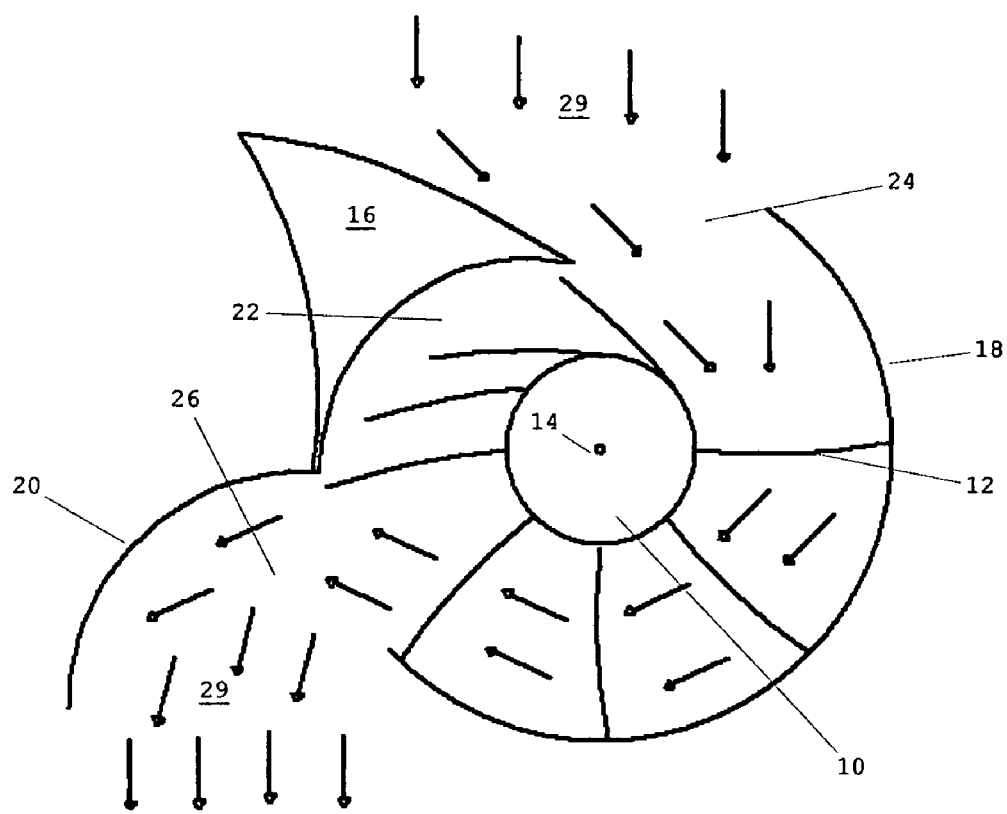
FIG. 2 is a top partial view of a power wheel with vanes and diversions showing water current.

FIG. 2 is a top partial view of a power wheel with vanes and diversions.

Figure 3:
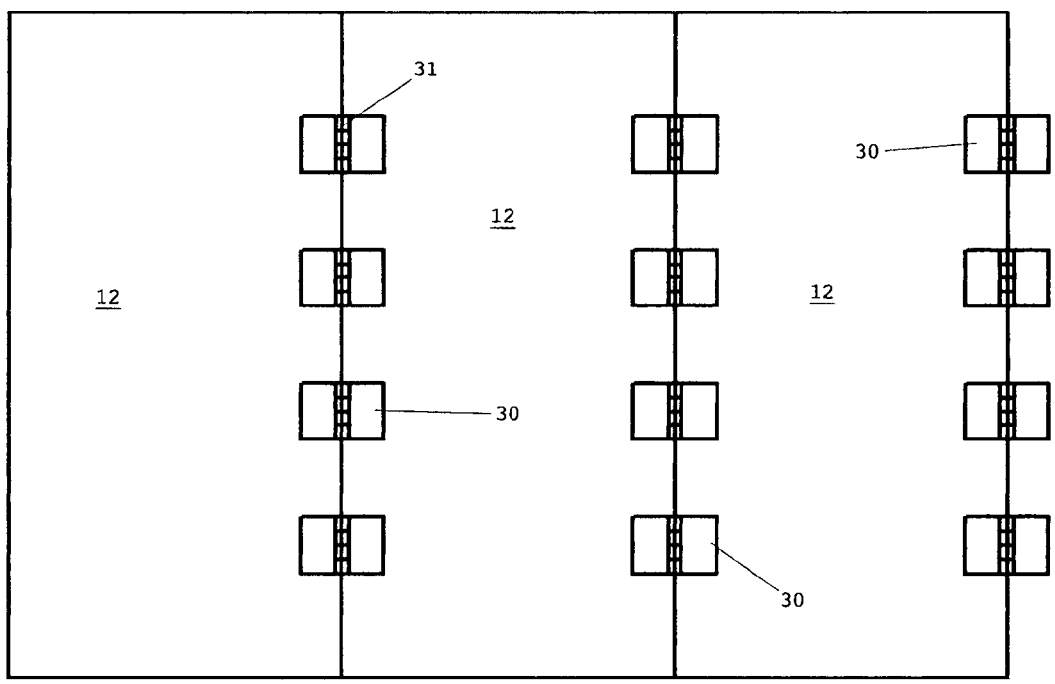
FIG. 3 is a front elevation view of a vane showing the section and hinge arrangement.

FIG. 3 is a front elevation view of a vanes showing the section and hinge arrangement.

Figure 4:
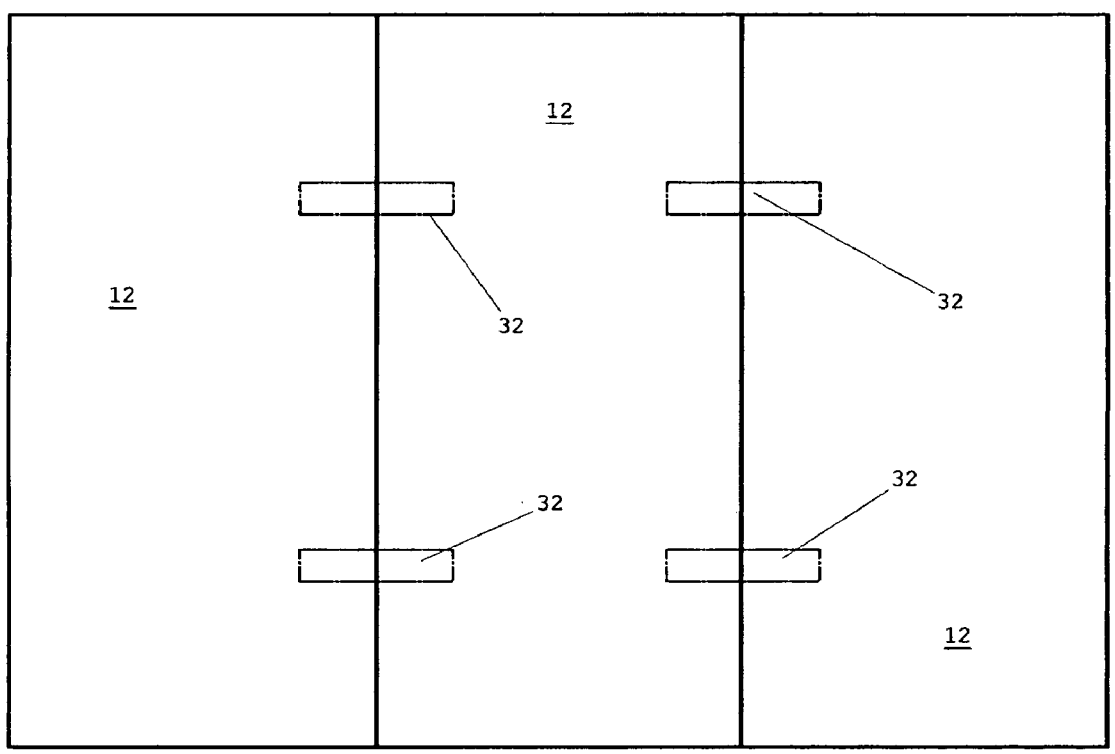
FIG. 4 is a rear elevation view of a vane showing sections and stops that prevent over extension of the vanes when under power.

FIG. 4 is a rear elevation view of a vane showing sections and stops that prevent over extension of the vanes when under power.

Figure 5:
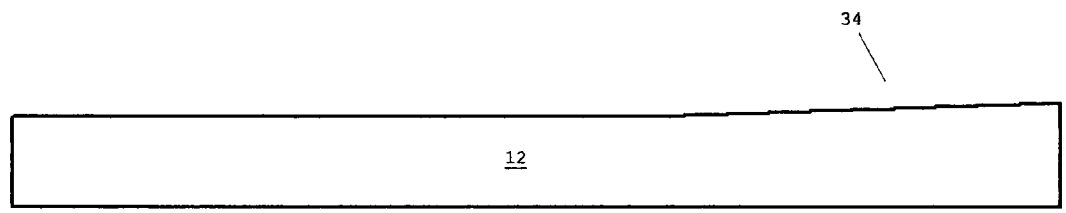
FIG. 5 is a top elevation view of a vane stop that prevents over extension of the vanes when under power.

FIG. 5 is a top elevation view of a vane stop that prevents over extension of the vanes when under power.

Figure 6:
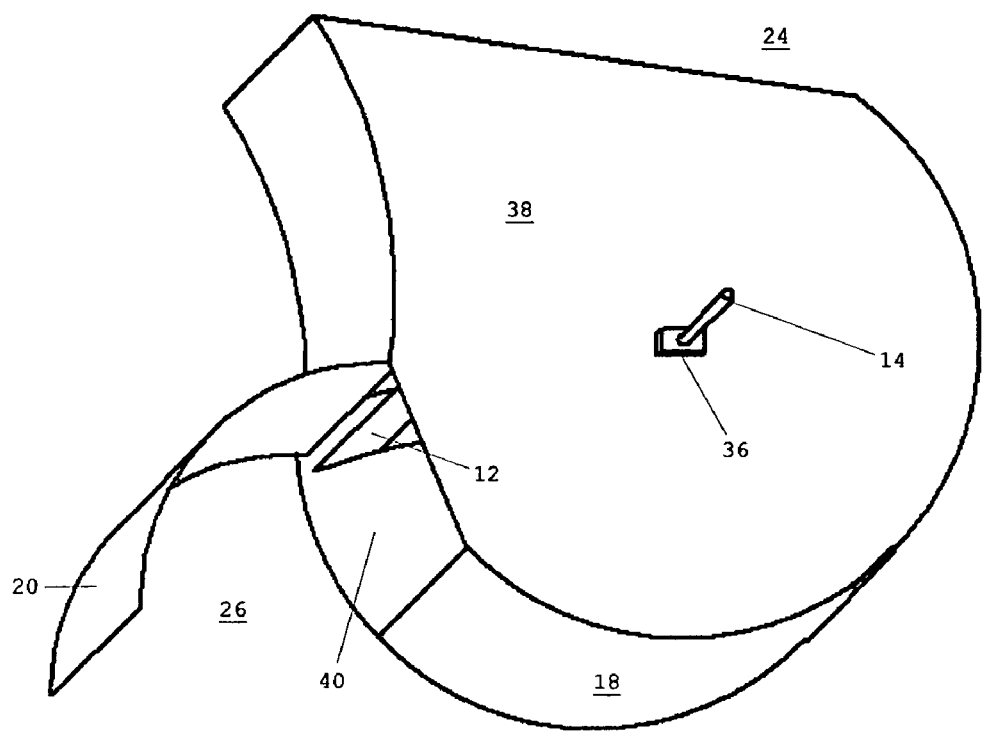
FIG. 6 is a top rear perspective view of the closed unit with all panels in closed and operating positions.

FIG. 6 is a top rear perspective view of the closed unit with all panels in closed and operating positions.

Figure 7:
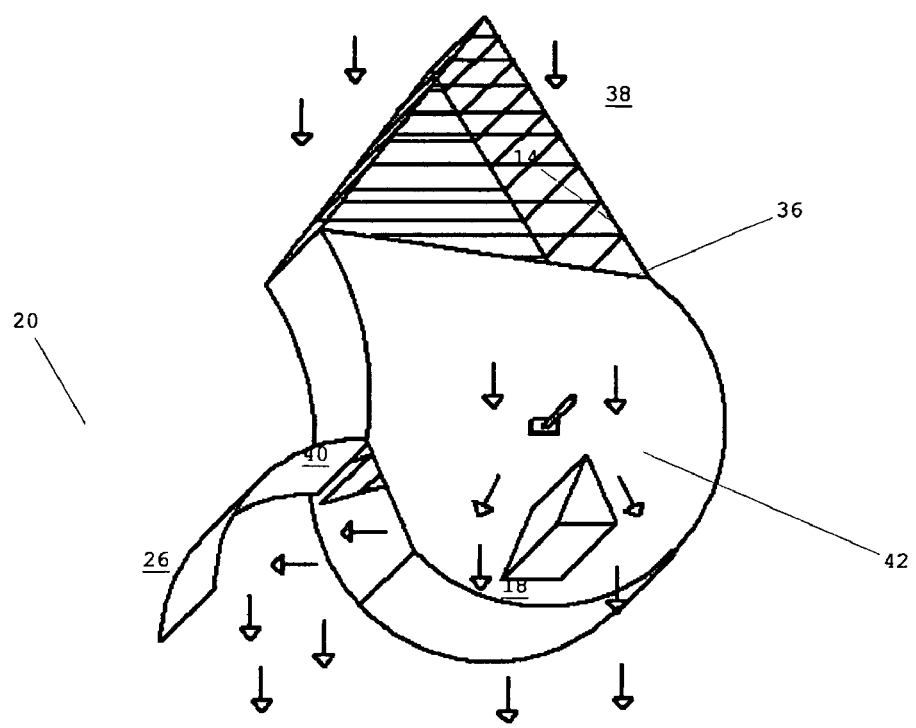
FIG. 7 is a top rear perspective view of an unit shown with a water vein for directional location so the opening faces into the current.

FIG. 7 is a top rear perspective view of a unit shown with a water vein for directional location so the opening faces into the current.

Figure 8:
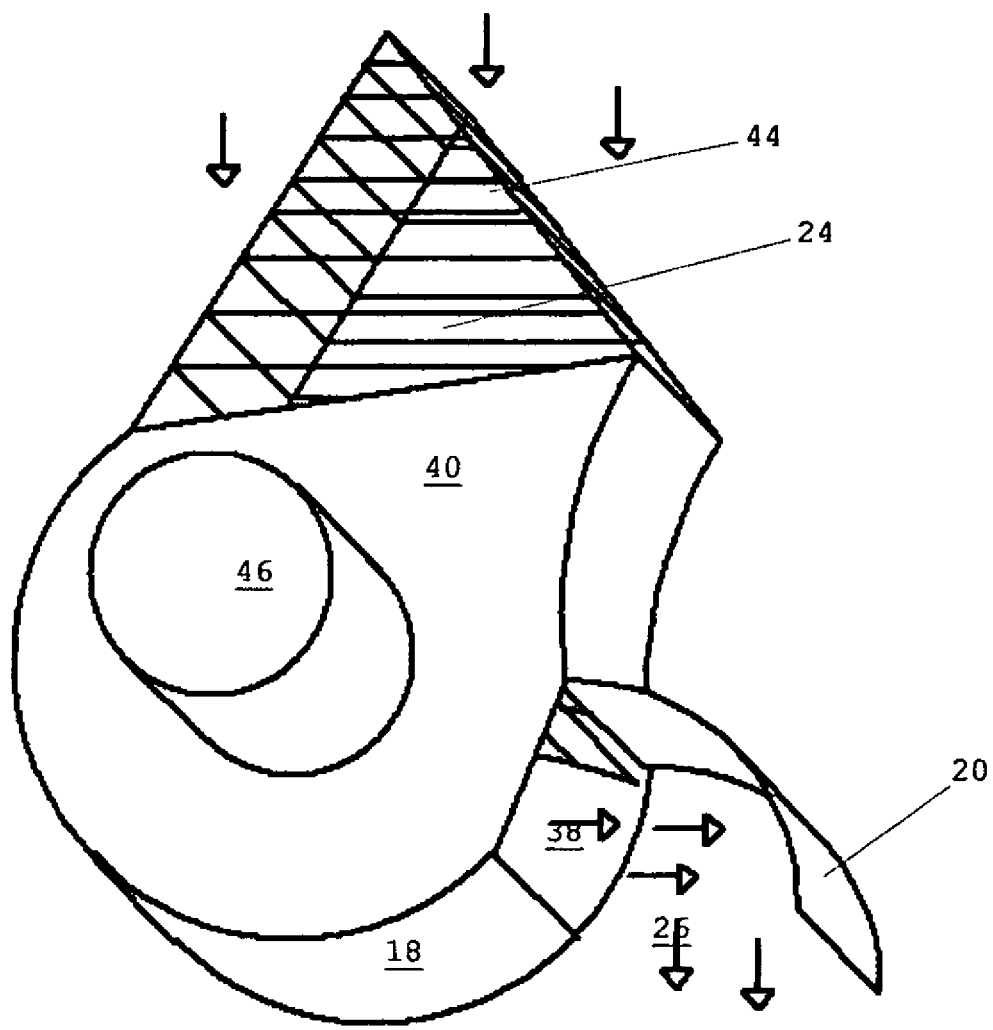
FIG. 8 is a bottom rear perspective view of a pivot device that permits the unit to rotate so that the opening is facing the oncoming current for areas where water current direction may change due to tides or tide effects.

FIG. 8 is a bottom rear perspective view of a pivot device that permits the unit to rotate so that the opening is facing the oncoming current for areas where water current 29 direction may change due to tides or tide effects.

Referring now to FIG. 1; the present invention is a water powered mechanism particularly adapted to derive energy from a moving stream of water known as a current. In the preferred embodiment the present invention consists of a power cylinder 10 rotatable horizontally with a power shaft 14 non-rotably coupled and centrally located vertically through the power cylinder 10 for coupling the present inventions derived energy to other devices such as a generator, pump or other power consuming device. The power cylinder 10 mechanism has a plurality of vane folding 28 sections attached to its vertical sides for the extraction of energy from the current by means of hinges 30. The hinges 30 consisting of two separate parts connected by means of a vertical shaft permit pivoting of the vane sections 12 providing a means for the vane sections 12 to lie back against the power cylinder 10 when the vane sections 12 encounter greater resistance to their forward side and less resistance to their rear side. The vane sections 12 are further fitted with a vane stop on the forward side configured by means of an angled surface to limit the movement of the vane sections 12 so as to provide a forward locked position opposing the torque generated by water current 29 to extract raw energy from the current and transfer it to the power cylinder 10.

The present invention includes a housing comprised of an inlet and return diversion section 16 configured to direct water currents toward the vane sections 12, a reduction chamber 22 configured to reduce the water currents rotational flow direction and eliminate reverse torque on the vane sections 12 as they enter the vane folding 28 area of the mechanism by limiting the water capacity through a restricted enclosure, a chamber wall 18 that encircles a large portion of the vane sections 12 rotatable area constricting the water current 29 to a confined area for raw energy extraction. An outlet diversion wall 20 prevents general water currents outside of the present invention from entering or interfering with the rotability and torque of the vane sections 12 by diverting the water current 29 around the water exit 26. Thus water may enter at the water entrance 24 and flow through the present invention and out the water exit 26 transferring its raw energy by means of torque to the vane sections 12 and thus transferred to the power cylinder 10 and thus further transferred to the power shaft 14 and ultimately to the work load.

Referring now to FIG. 2; in a most preferred orientation of the present invention, the illustration indicates the directional flow of water current 29 though the present invention. Water current 29 enters the mechanism indicated generally as water entrance 24 and water current 29 flows in the direction general indicated by the arrows. As the water current 29 enters the mechanism at the water entrance 24 it begins to cause thrust against the vane sections 12. This thrust causes the power cylinder 10 to turn rotational in a horizontal plain driving the power shaft 14 with a torque related to the force of the water current 29 exerted against the rear side of the vane sections 12. As the vane sections 12 rotate on their horizontal plane the water travels through the mechanism contained inside of the enclosure, partially shown, until it can exit through the water exit 26 and past the outlet diversion wall 20.

Though the most preferred orientation of the invention is depicted in FIG. 2, it should be understood that other orientations form horizontal to vertical planes may be used and are encompassed in this description.

Referring now to FIG. 3; in a preferred embodiment of the present invention vane sections 12 are hingeably connected to each other and the power cylinder 10, not shown, to provide a rigid vane in one direction and collapsible vane in the opposite direction. Vane sections 12 are connected together by hinges 30 readily available as door hinges 30 consisting of two parts and a center hinge pin 31 to connect the two parts together in rotable manner, until the correct length for a particular sized vane unit is achieved. The vane sections 12 are opened or extended by means of water current 29 pressure exerted to the rear side of the vane sections 12 until they reach their optimum open position. When water pressure is reduced on the rear portion of the vane sections 12 and increased on the forward side of the vane sections 12, the vane sections 12 collapse rear ward against the power drum to reduce forward water friction and resistance.

It is understood that in a preferred embodiment of the present invention that the vane sections 12 are generally rectangular in shape, but that other shapes could well be utilized for effective vane performance including, but not limited to generally square, generally half round, generally round and generally triangular in shape.

Referring now to FIG. 4; in a preferred embodiment of the present invention the vane sections 12 are equipped with vane stops 32 to prevent the vane sections 12 from exceeding their intended open position. The vane stops 32 are secureably attached to a first vane section preventing a second vane section from rotating past a predetermined angle. The vane stops 32 are equipped with an angled edge 34 to determine the angle of the second vane section when attached to the first vane section. The vane stops 32 are placed on the forward side of the vane sections 12 which is the opposite side of the water current 29.

It is understood that in a preferred embodiment of the present invention that the vane stops 32 are one piece in construction but that optional methods could be used to achieve a vane stop such as adjustable or multi piece vane stops 32 and are covered under the spirit of this present invention.

Referring now to FIG. 5; in a preferred form of the present invention the vane stop is a generally rectangular stop with an angled edge 34 on the receiving portion to accommodate a chosen vane section angle. The vane stop is securely attachable to a first vane section and positionally connected to a second vane section in order to prevent a second vane section from rotating past the correct angle while permitting a second vane section to engage in vane folding 28 when the rear current force is reduced to below that of the forward current pressure.

Optional vane stop configurations may occur in various forms of the preferred embodiment such as adjustable position stops and various shapes all serving to stop and position the vane sections 12 according to the users needs. It should be understood that all of these variations are contained in the scope of this present invention.

Referring now to FIG. 6; in a preferred embodiment of the present invention a housing consisting of a generally boxed configuration with a water entrance 24 generally located at the up current side and an inlet and return diversion section 16 securely attached to chamber wall 18, upper containment panel 38 and a lower containment panel 40 to direct the flow of water through the present invention where it then exits at the water exit 26 location generally indicated and diverted to the down current side of the present invention by means of the outlet diversion wall 20. The greatest portion of the water exits the present invention before entering the reduction chamber 22, not shown.

The vane sections 12 rotate internal of the generally box shaped mechanism and extract the raw energy from the water current 29 channeling it through the power cylinder 10, not shown, to the power shaft 14. The power shaft 14 is non-rotably securely attached to the power cylinder 10, not shown, and is held rotably in position by means of an upper and lower, not shown, bearing 36. The bearing 36 is removably attached to the upper bearing 36 containment panel and the lower containment panel 40 respectively in a manner that secures the power shaft 14 and reduces friction.

Referring now to FIG. 7; in a preferred embodiment of the present invention there is a direction vane 42 secureably attached to the top of the upper containment panel 38 to orient the water entrance 24 generally indicated toward the oncoming water current 29 for greatest effect especially where water currents change direction. The direction vane 42 is generally triangular in shape with sufficient height to cause the present invention to rotate on its axis for orientation into the oncoming current. The generally V shaped configuration creates greater drag on the wider portion and less drag on the pointed potion causing the direction vane 42 to orientate itself in a downstream position through rotation of the present invention. A stop, not shown, prevents the present invention from rotating more than 360 degrees. The direction vane 42 orients the present invention so that the water current 29 enters at the water entrance 24 point generally indicated passing between the upper containment panel 38, lower containment panel 40, chamber wall 18 and exits at the water exit 26 point generally indicated being diverted by the outer diversion wall and in doing so causes the greatest possible extraction of the raw energy from the water current 29 transferring it through the power shaft 14 held rotably in place by the upper and lower bearing 36.

It is understood that in a second preferred embodiment of the present invention the direction vane 42 could take a different form than triangular and that FIG. 7 serves to depict one form of a direction vane 42, but that all forms of a direction vane 42 are covered.

Referring now to FIG. 8; the bottom view of a preferred embodiment of the present invention and more particularly to the debris screen 44 and pivot drum 46. The debris screen 44 consists of opening sizes determined by the water conditions and debris contained therein. The debris screen 44 is weldably fabricated with generally triangular shaped sides and a sloping to the rear top and rear bottom. The debris screen 44 is removably attached to the water entrance 24 portion of the generally box shaped present invention.

The pivot drum 46 is centrally rotably attached to the outside of the lower containment panel 40 of the present invention in a preferred form of the invention. It is generally cylindrical in shape and rotable on its axis when affixed to the bottom surface of the water body. In a second preferred embodiment of the present invention the pivot drum 46 is equipped with a stop to prevent the generally box shaped upper structure from rotating more than 360 degrees. In a third embodiment of the present invention the pivot drum 46 would be a generally square shape and contain a rotable surface to which the lower containment panel 40 is attached.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A water current powered motor for extracting raw power from water and converting it to kinetic energy, comprising:

means for transferring the power from the vanes to the shaft and diverting the water to the vanes for greater power;

means for collecting the transfer of raw power from the water current;

means for transferring power from the power cylinder to the work;

means for diverting water into the unit;

means for reducing water pressure against the forward side of the vanes thus decreasing the power requirement of the unit to flow its vanes back into the on coming water current;

means for serving as a housing structure to contain the raw energy contained in the water current;

means for preventing natural water current from effecting the outwardly flow of water passing through the water powered current generator;

means for the vanes to collapse in order to reduce water resistance when the vanes are moving in a non-power direction;

means for permitting the vane parts to fold on predictable lines;

means for stopping the vanes from going past their proper position;

means for retaining the power shaft into its proper location, stabilization of the power shaft with as low a friction coefficient as possible, accepting both thrust and radial pressures exerted on the power shaft;

means for containing the water inside the unit so that the fins can extract the energy, it also directs the water current so that current energy is contained rather than lost to fin resistance;

means for containing the water inside the unit so that the fins can extract the energy, it also directs the water current so that current energy is contained rather than lost to fin resistance;

means for orientating the water current generator's water inlet to the direction of the oncoming current for the most effective association of current flow, the direction vein permits the unit to be used in areas of changing current direction such as in tides, ocean currents and tide effect waters;

means for preventing unwanted and large debris from entering the unit and clogging it; and means for enabling the water current generator to pivot on its axis for the purpose of rotating the units opening or water inlet into the direction of the oncoming water current.

2. The water current powered motor in accordance with claim 1, wherein said means for transferring the power from the vanes to the shaft and diverting the water to the vanes for greater power comprises a cylindrical, rigid, rotatable power cylinder.

3. The water current powered motor in accordance with claim 1, wherein said means for collecting the transfer of raw power from the water current comprises a generally flat, slightly concaved, rigid vane sections.

4. The water current powered motor in accordance with claim 1, wherein said means for transferring power from the power cylinder to the work comprises a cylindracal, strong, rigid power shaft.

5. The water current powered motor in accordance with claim 1, wherein said means for diverting water into the unit comprises a generally flat, rigid, impervious inlet and return diversion section.

6. The water current powered motor in accordance with claim 1, wherein said means for reducing water pressure against the forward side of the vanes thus decreasing the power requirement of the unit to flow its vanes back into the on coming water current comprises a restricted, generally curved reduction chamber.

7. The water current powered motor in accordance with claim 1, wherein said means for serving as a housing structure to contain the raw energy contained in the water current comprises a rigid, generally curved chamber wall.

8. The water current powered motor in accordance with claim 1, wherein said means for preventing natural water current from effecting the outwardly flow of water passing through the water powered current generator comprises a rigid, generally curved, impervious outlet diversion wall.

9. The water current powered motor in accordance with claim 1, wherein said means for the vanes to collapse in order to reduce water resistance when the vanes are moving in a non-power direction comprises a collapsable, resistance reduction vane folding.

10. The water current powered motor in accordance with claim 1, wherein said means for permitting the vane parts to fold on predictable lines comprises a pivotal, durable, low friction hinges.

11. The water current powered motor in accordance with claim 1, wherein said means for stopping the vanes from going past their proper position comprises a durable, rigid, angled portion greater than 1 degree vane stops.

12. The water current powered motor in accordance with claim 1, wherein said means for retaining the power shaft into its proper location. stabilization of the power shaft with as low a friction coefficient as possible, accepting both thrust and radial pressures exerted on the power shaft comprises a low friction, water resistant, durable, attachable bearing.

13. The water current powered motor in accordance with claim 1, wherein said means for containing the water inside the unit so that the fins can extract the energy, it also directs the water current so that current energy is contained rather than lost to fin resistance comprises a solid, rigid, low friction coefficent upper containment panel.

14. The water current powered motor in accordance with claim 1, wherein said means for containing the water inside the unit so that the fins can extract the energy, it also directs the water current so that current energy is contained rather than lost to fin resistance comprises a solid, rigid, low friction coefficent lower containment panel.

15. The water current powered motor in accordance with claim 1, wherein said means for orientating the water current generator's water inlet to the direction of the oncoming current for the most effective association of current flow, the direction vein permits the unit to be used in areas of changing current direction such as in tides, ocean currents and tide effect waters comprises a pointed, rigid, strong direction vane.

16. The water current powered motor in accordance with claim 1, wherein said means for preventing unwanted and large debris from entering the unit and clogging it comprises a perforated, strong, new attribute 3 debris screen.

17. The water current powered motor in accordance with claim 1, wherein said means for enabling the water current generator to pivot on its axis for the purpose of rotating the units opening or water inlet into the direction of the oncoming water current comprises a rotatable, sturdy pivot drum.

18. A water current powered motor for extracting raw power from water and converting it to kinetic energy, comprising:
   a cylindrical, rigid, rotatable power cylinder, for transferring the power from the vanes to the shaft and diverting the water to the vanes for greater power;
   a generally flat, slightly concaved, rigid vane sections, for collecting the transfer of raw power from the water current;
   a cylindracal, strong, rigid power shaft, for transferring power from the power cylinder to the work;
   a generally flat, rigid, impervious inlet and return diversion section, for diverting water into the unit;
   a restricted, generally curved reduction chamber, for reducing water pressure against the forward side of the vanes thus decreasing the power requirement of the unit to flow its vanes back into the on coming water current;
   a rigid, generally curved chamber wall, for serving as a housing structure to contain the raw energy contained in the water current;
   a rigid, generally curved, impervious outlet diversion wall, for preventing natural water current from effecting the outwardly flow of water passing through the water powered current generator;
   a collapsable, resistance reduction vane folding, for the vanes to collapse in order to reduce water resistance when the vanes are moving in a non-power direction;
   a pivotal, durable, low friction hinges, for permitting the vane parts to fold on predictable lines;
   a durable, rigid, angled portion greater than 1 degree vane stops, for stopping the vanes from going past their proper position;
   a low friction, water resitant, durable, attachable bearing, for retaining the power shaft into its proper location, stabilization of the power shaft with as low a friction coefficient as possible, accepting both thrust and radial pressures exerted on the power shaft;
   a solid, rigid, low friction coefficent upper containment panel, for containing the water inside the unit so that the fins can extract the energy, it also directs the water current so that current energy is contained rather than lost to fin resistance;
   a solid, rigid, low friction coefficent lower containment panel, for containing the water inside the unit so that the fins can extract the energy, it also directs the water current so that current energy is contained rather than lost to fin resistance;
   a pointed, rigid, strong direction vane, for orientating the water current generator's water inlet to the direction of the oncoming current for the most effective association of current flow, the direction vein permits the unit to be used in areas of changing current direction such as in tides, ocean currents and tide effect waters;

a perforated, strong, new attribute 3 debris screen, for preventing unwanted and large debris from entering the unit and clogging it; and a rotatable, sturdy pivot drum, for enabling the water current generator to pivot on its axis for the purpose of rotating the units opening or water inlet into the direction of the oncoming water current.

19. The water current powered motor as recited in claim 18, further comprising:

a rigid, durable, angled angled edge, for providing a positive stop for the vane sections and permitting the stop to decide to what angle the vane section may open to allow for cupped or flared vanes depending upon water speed and conditions.

20. A water current powered motor for extracting raw power from water and converting it to kinetic energy, comprising:

a cylindrical, rigid, rotatable power cylinder, for transferring the power from the vanes to the shaft and diverting the water to the vanes for greater power;

a generally flat, slightly concaved, rigid vane sections, for collecting the transfer of raw power from the water current;

a cylindracal, strong, rigid power shaft, for transferring power from the power cylinder to the work;

a generally flat, rigid, impervious inlet and return diversion section, for diverting water into the unit;

a restricted, generally curved reduction chamber, for reducing water pressure against the forward side of the vanes thus decreasing the power requirement of the unit to flow its vanes back into the on coming water current;

a rigid, generally curved chamber wall, for serving as a housing structure to contain the raw energy contained in the water current;

a rigid, generally curved, impervious outlet diversion wall, for preventing natural water current from effecting the outwardly flow of water passing through the water powered current generator;

a collapsable, resistance reduction vane folding, for the vanes to collapse in order to reduce water resistance when the vanes are moving in a non-power direction;

a pivotal, durable, low friction hinges, for permitting the vane parts to fold on predictable lines;

a durable, rigid, angled portion greater than 1 degree vane stops, for stopping the vanes from going past their proper position;

a rigid, durable, angled angled edge, for providing a positive stop for the vane sections and permitting the stop to decide to what angle the vane section may open to allow for cupped or flared vanes depending upon water speed and conditions;

a low friction, water resitant, durable, attachable bearing, for retaining the power shaft into its proper location, stabilization of the power shaft with as low a friction coefficient as possible, accepting both thrust and radial pressures exerted on the power shaft;

a solid, rigid, low friction coefficient upper containment panel, for containing the water inside the unit so that the fins can extract the energy, it also directs the water current so that current energy is contained rather than lost to fin resistance;

a solid, rigid, low friction coefficient lower containment panel, for containing the water inside the unit so that the fins can extract the energy, it also directs the water current so that current energy is contained rather than lost to fin resistance;

a pointed, rigid, strong direction vane, for orientating the water current generator's water inlet to the direction of the oncoming current for the most effective association of current flow, the direction vein permits the unit to be used in areas of changing current direction such as in tides, ocean currents and tide effect waters;

a perforated, strong, new attribute 3 debris screen, for preventing unwanted and large debris from entering the unit and clogging it; and a rotatable, sturdy pivot drum, for enabling the water current generator to pivot on its axis for the purpose of rotating the units opening or water inlet into the direction of the oncoming water current.

* * * * *